(12) United States Patent
Hahn et al.

(10) Patent No.: US 9,031,039 B2
(45) Date of Patent: May 12, 2015

(54) METHOD AND APPARATUS FOR PERFORMING HANDOVER PROCEDURE IN WIRELESS COMMUNICATION SYSTEM

(75) Inventors: Gene Beck Hahn, Gyeongki-do (KR); Jian Xu, Gyeongki-do (KR); Seung June Yi, Gyeongki-do (KR); Young Dae Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 13/583,761

(22) PCT Filed: May 13, 2011

(86) PCT No.: PCT/KR2011/003560
§ 371 (c)(1),
(2), (4) Date: Sep. 10, 2012

(87) PCT Pub. No.: WO2011/142628
PCT Pub. Date: Nov. 17, 2011

(65) Prior Publication Data
US 2013/0003648 A1    Jan. 3, 2013

Related U.S. Application Data

(60) Provisional application No. 61/353,665, filed on Jun. 11, 2010, provisional application No. 61/334,594, filed on May 14, 2010.

(51) Int. Cl.
| | | |
|---|---|---|
| *H04W 4/00* | (2009.01) | |
| *H04W 36/00* | (2009.01) | |
| *H04W 36/34* | (2009.01) | |
| *H04W 88/04* | (2009.01) | |
| *H04B 7/02* | (2006.01) | |
| *H04B 7/26* | (2006.01) | |
| *H04W 84/04* | (2009.01) | |
| *H04W 92/20* | (2009.01) | |

(52) U.S. Cl.
CPC .......... *H04W 36/0005* (2013.01); *H04W 36/34* (2013.01); *H04W 36/0011* (2013.01); *H04W 88/04* (2013.01); *H04B 7/026* (2013.01); *H04B 7/2606* (2013.01); *H04W 84/047* (2013.01); *H04W 92/20* (2013.01)

(58) Field of Classification Search
None
See application file for complete search history.

(56) References Cited

U.S. PATENT DOCUMENTS

| | | |
|---|---|---|
| 2008/0192694 A1 | 8/2008 | Lee et al. |
| 2009/0005050 A1 | 1/2009 | Lee et al. |

(Continued)

FOREIGN PATENT DOCUMENTS

| | | |
|---|---|---|
| KR | 10-2006-0130489 A | 12/2006 |
| KR | 10-2007-0073365 A | 7/2007 |
| WO | WO 2010/125956 A1 * | 4/2010 |

OTHER PUBLICATIONS

Author Unknown, 3GPP TS 23.401 version 9.0.0, pp. 1-225, May 2009.*

(Continued)

*Primary Examiner* — Christopher Crutchfield
(74) *Attorney, Agent, or Firm* — Morgan, Lewis & Bockius LLP

(57) ABSTRACT

A method and apparatus of performing a handover procedure in a wireless communication system is provided. The method includes receiving a handover request message from a relay node (RN), and determining whether a first X2 interface between the donor BS and a target BS is available or not.

9 Claims, 13 Drawing Sheets

(56) References Cited

U.S. PATENT DOCUMENTS

| | | |
|---|---|---|
| 2009/0061876 A1 | 3/2009 | Ho et al. |
| 2010/0111041 A1 | 5/2010 | Lim et al. |
| 2010/0118781 A1 | 5/2010 | Petrovic et al. |
| 2010/0202410 A1* | 8/2010 | Watanabe et al. ............ 370/331 |
| 2010/0260097 A1* | 10/2010 | Ulupinar et al. .............. 370/315 |
| 2010/0272007 A1* | 10/2010 | Shen et al. ................... 370/315 |
| 2010/0284366 A1* | 11/2010 | Zhu ............................... 370/331 |
| 2010/0323749 A1* | 12/2010 | Lee et al. ...................... 455/524 |
| 2011/0235514 A1* | 9/2011 | Huang et al. .................. 370/235 |
| 2012/0093125 A1* | 4/2012 | Hapsari et al. ............... 370/331 |

OTHER PUBLICATIONS

Author Unknown, 3GPP TS 36.300 version 8.8.0, pp. 1-157, Mar. 2009.*
Author Unknown, 3GPP TS 36.423 v 9.2.0, pp. 1-120, Mar. 2010.*
Author Unknown, Submission to meeting 66 of 3GPP TSG-RAN Working Group 2, R2-0993972, Jul. 3, 2009, pp. 1-30.*
Search Report issued in corresponding International Application No. PCT/KR2011/003560 dated Dec. 19, 2011.
Office Action issued in counterpart Korean Patent Application No. 10-2012-7029745 dated Mar. 7, 2014.

* cited by examiner (a)

(b)

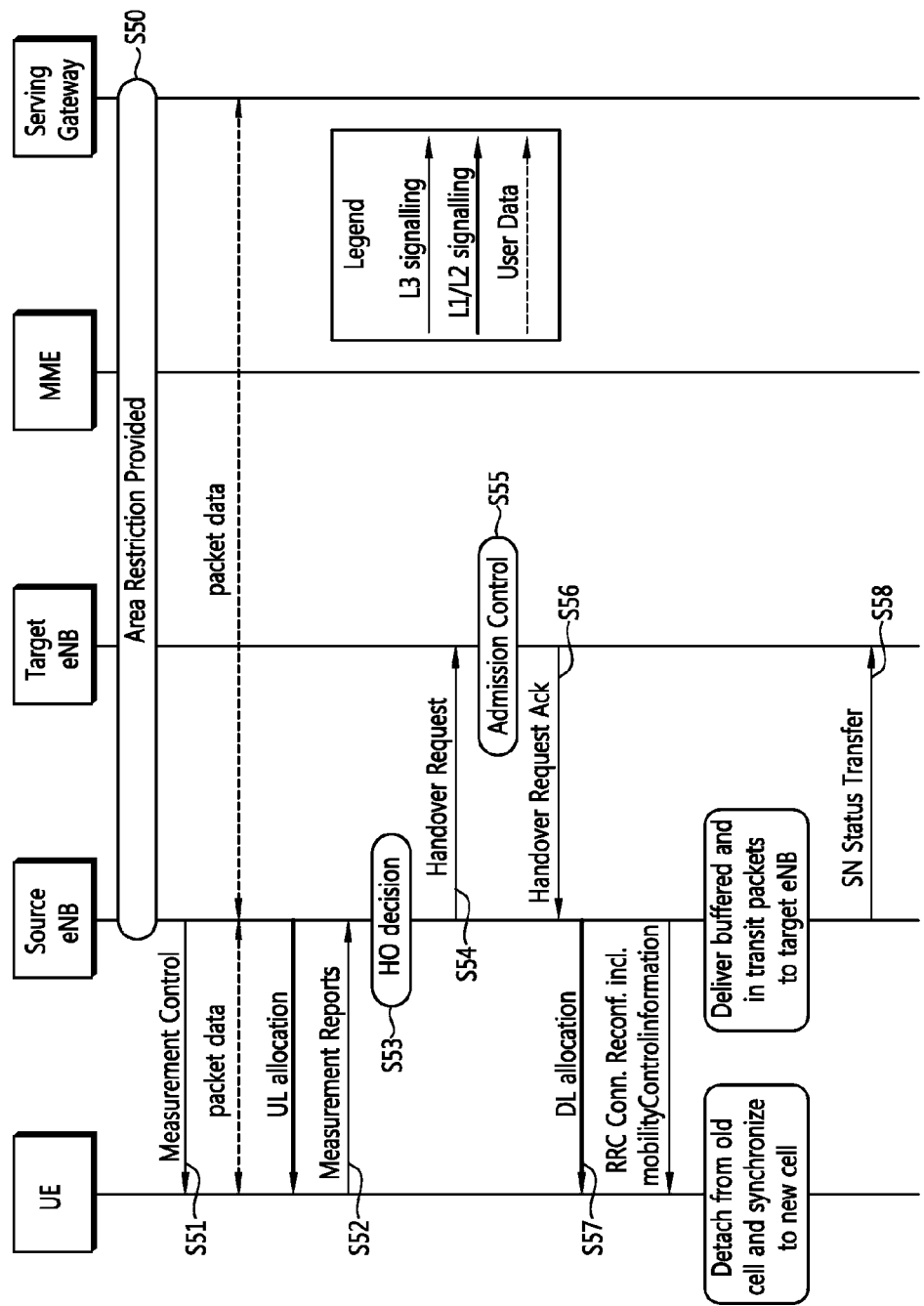

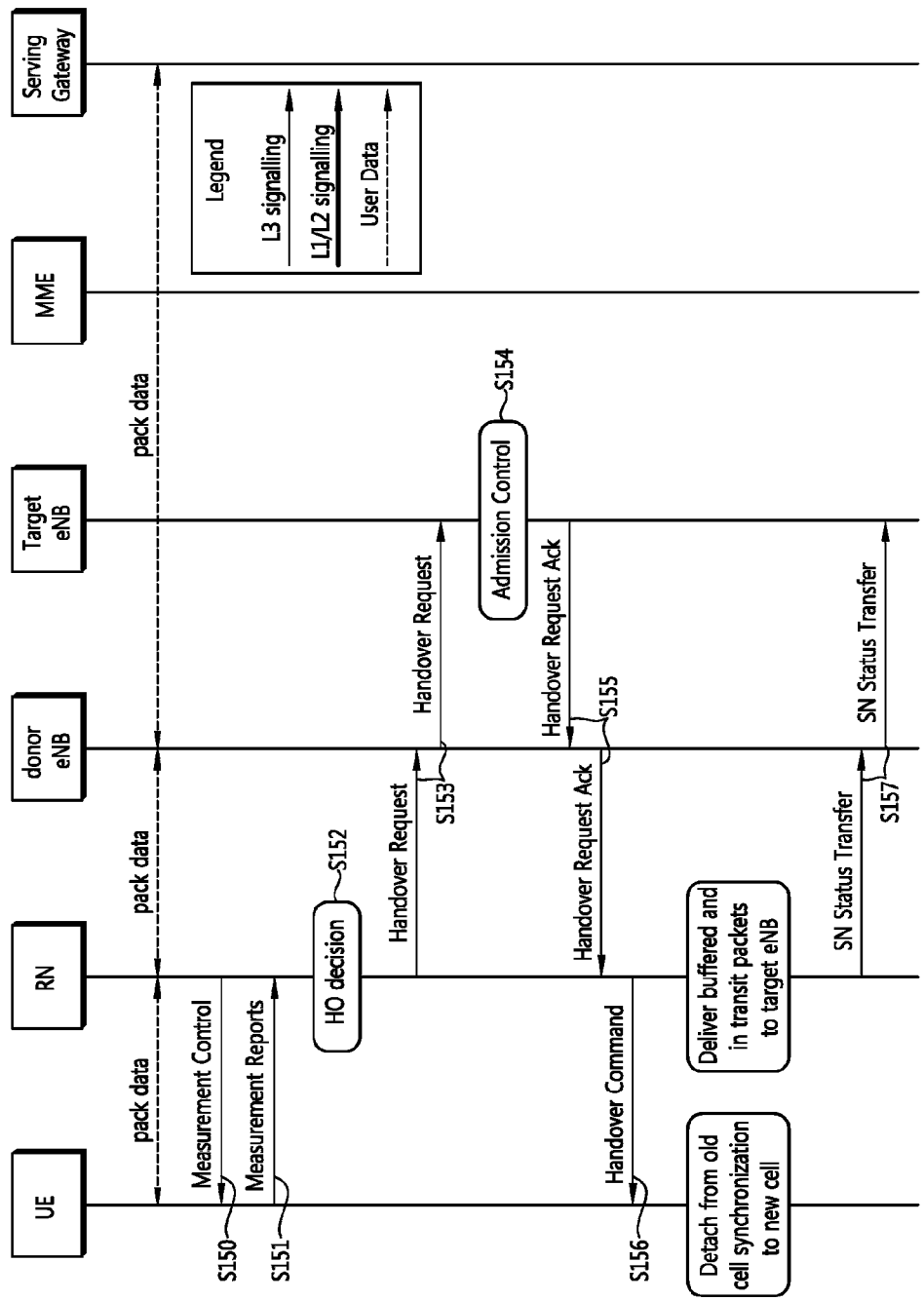

METHOD AND APPARATUS FOR PERFORMING HANDOVER PROCEDURE IN WIRELESS COMMUNICATION SYSTEM

This is a National Phase Entry of PCT Application No. PCT/KR2011/003560, filed May 13, 2011, and claims the benefit of U.S. Provisional Application Nos. 61/353,665 filed Jun. 11, 2010 and 61/334,594 filed May 14, 2010.

TECHNICAL FIELD

The present invention relates to wireless communication, and more particularly, to a method and apparatus for performing handover procedure in a wireless communication system.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signalling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 is a block diagram depicting architecture of a typical E-UTRAN and a typical EPC. As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIG. 3 is block diagram depicting the user-plane protocol and the control-plane protocol stack for the E-UMTS. FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNB 20 on the network side) may perform functions such as Scheduling, Automatic Repeat Request (ARQ), and Hybrid Automatic Repeat Request (HARM). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE state, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 is an example of structure of a physical channel. The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carry dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

In E-UTRAN, network-controlled UE-assisted handovers may be performed in RRC-CONNECTED state. The handover procedure is performed without EPC involvement. That is, preparation messages are directly exchanged between the eNBs. The release of the resources at the source side during the handover completion phase is triggered by the eNB.

FIG. 5 is a basic intra-MME/serving gateway handover procedure. It may be referred to paragraph 10.1.2.1.1 of "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)" to 3GPP (3rd Generation Partnership Project) TS 36.300 V9.3.0 (2010-03).

First, the handover preparation procedure is described in FIG. 5(a).

In step S50, area restriction information is provided. The UE context within the source eNB contains information regarding roaming restrictions which where provided either at connection establishment or at the last timing advance (TA) update.

In step S51, the source eNB configures the UE measurement procedures according to the area restriction information, and transmits a measurement control message to the UE through L3 signaling. Measurements provided by the source eNB may assist the function controlling the UE's connection mobility. Meanwhile, the packet data is exchanged between the UE and the source eNB, or between the source eNB and the serving gateway.

In step S52, the UE transmits measurement reports by the rules set by i.e. system information, specification etc to the source eNB through L3 signaling.

In step S53, the source eNB makes handover decision based on measurement reports and radio resource management (RRM) information.

In step S54, the source eNB transmits a handover request message through L3 signaling to the target eNB passing necessary information to prepare the HO at the target side. The necessary information may include UE X2 signaling context reference at source eNB, UE S1 EPC signalling context reference, target cell identifier (ID), $K_{eNB*}$, RRC context including the cell-radio network temporary identifier (C-RNTI) of the UE in the source eNB, AS-configuration, E-UTRAN radio access bearer (E-RAB) context and physical layer ID of the source cell+MAC for possible RLF recovery, etc. UE X2/UE S1 signaling references enable the target eNB to address the source eNB and the EPC. The E-RAB context includes necessary radio network layer (RNL) and transport network layer (TNL) addressing information, and quality of service (QoS) profiles of the E-RABs.

In step S55, the target eNB performs admission control. Admission control may be performed dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

In steps S56, the target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

In step S57, the target eNB transmits an RRCConnectionReconfiguration message to perform the handover including the mobilityControlInformation, to be sent by the source eNB to the UE. The source eNB performs the necessary integrity protection and ciphering of the message. The UE receives the RRCConnectionReconfiguration message with necessary parameters. The necessary parameters may include new C-RNTI, target eNB security algorithm identifiers, and optionally dedicated RACH preamble, target eNB SIBs, etc. The UE is commanded by the source eNB to perform the handover. The UE does not need to delay the handover execution for delivering the HARQ/ARQ responses to the source eNB.

Hereafter, the handover execution procedure will be described.

When the handover execution procedure starts, the UE detaches from old cell and synchronizes to new cell. In addition, the source eNB delivers buffered and in-transit packets to the target eNB.

In step S58, the source eNB transmits an SN status transfer message to the target eNB to convey the uplink PDCP SN receiver status and the downlink PDCP SN transmitter status of E-RABs for which PDCP status preservation applies (i.e. for RLC AM). The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

FIG. 5(b) is continued from FIG. 5(a).

In step S59, the UE performs synchronization to the target eNB and access the target cell via RACH. The access to the target cell via RACH may be a contention-free procedure if a dedicated RACH preamble was indicated in the mobilityControlInformation. Or, the access to the target cell via RACH may be a contention-based procedure if no dedicated preamble was indicated. The UE derives target eNB specific keys and configures the selected security algorithms to be used in the target cell.

In step S60, the target eNB responds to the synchronization of the UE with UL allocation and timing advance.

In step S61, when the UE has successfully accessed the target cell, the UE transmits an RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin transmitting data to the UE. The packet data is exchanged between the UE and the target eNB.

Hereafter, the handover completion procedure will be described.

In step S62, the target eNB transmits a path switch message to MME to inform that the UE has changed cell.

In step S63, the MME transmits an update user plane request message to the serving gateway.

In step S64, the serving gateway switches the downlink data path to the target side. The serving gateway transmits one or more end marker packets on the old path to the source eNB and then can release any U-plane/TNL resources towards the source eNB.

In step S65, serving gateway transmits an update user plane response message to MME.

In step S66, the MME transmits a path switch acknowledge message to the target eNB to confirm the path switch message.

In step S67, the target eNB transmits a UE context release message to the source eNB to inform success of the handover and trigger the release of resources.

In step S68, when the UE context release message is received, the source eNB can release radio and C-plane related resources associated to the UE context. Any ongoing data forwarding may continue.

According to 3GPP TS 23.401 V9.4.0 (2010-03) "3rd Generation Partnership Project; Technical Specification Group Services and System Aspects; General Packet Radio Service (GPRS) enhancements for Evolved Universal Terrestrial Radio Access Network (E-UTRAN); access (Release 9)", the source eNB makes handover decision based on the measurement report toward the target eNB. The handover may be initiated through X2 or S1 interface. The handover decision on the necessity of handover through X2 or S1 interface is made at the source eNB. There are two types of handover, i.e., X2 based handover and S1 based handover. Conventionally, the S1 based handover is supported regardless of the availability of X2 interface, and the X2 based handover is prioritized over the S1 based handover when X2 interface is available.

Meanwhile, a wireless communication system including a relay station (RS) has been developed recently. The relay station serves to expand cell coverage and improve transmission performance. The cell coverage may be expanded as a base station provides service to a mobile station located at the coverage boundary of the base station by using a relay station. Furthermore, since the relay station enhances the reliability of signal transmission between the base station and the mobile station, transmission capacity can be increased. Even when a mobile station is within the coverage of the base station, the relay station may be used in the case where the mobile station is located in a shadow zone.

3GPP LTE-advance (LTE-A) is an evolution of the 3GPP LTE. The relay system can be introduced in 3GPP LTE-A. It is seen that both the S1 and X2 handover shall be supported for relaying network in 3GPP LTE-A system. That means, the 3GPP LTE handover procedures shall be reused for the handover scenarios in 3GPP LTE-A system. According to the introduction of the relay system, a conventional handover procedure described above can be changed.

An efficient handover method when a relay node is deployed is required.

SUMMARY OF INVENTION

Technical Problem

The present invention provides a method and apparatus for performing a handover procedure in a wireless communication system. The present invention provides a handover method for reducing handover delay by avoiding a handover error, which can be occurred when an evolved NodeB (eNB) receives a handover request message indicating non-appropriate handover type. Particularly, in case that the RN is deployed, the present invention provides a handover method for reducing handover delay by avoiding a handover error, which can be occurred when an X2 interface is not available between an eNB which controls the RN and a target eNB to be handovered.

Solution to Problem

In an aspect, a method of performing a handover procedure by a donor base station (BS) in a wireless communication system is provided. The method include receiving a handover request message from a relay node (RN), and determining whether a first X2 interface between the donor BS and a target BS is available or not.

The method may further include transmitting an X2 handover request message to the target BS if the first X2 interface between the donor BS and the target BS is available.

The method may further include transmitting an S1 handover required message to a mobility management entity (MME) if the first X2 interface between the donor BS and the target BS is not available.

The RN may receive a measurement report from a user equipment.

The handover request message may include an indicator indicating the desire for a handover.

The handover request message may include information on the target BS.

The handover request message may be received through a second X2 interface between the RN and the donor BS.

The method may further include transmitting an X2 connection request message to the target BS if the first X2 interface between the donor BS and the target BS is not available.

The method may further include receiving an X2 connection response message from the target BS if the first X2 interface between the donor BS and the target BS is able to be setup.

The method may further include receiving an X2 connection failure message from the target BS if the first X2 interface between the donor BS and the target BS is not able to be setup.

In another aspect, a donor base station (BS) in a wireless communication system is provided. The donor BS includes a radio frequency (RF) unit, and a processor, coupled to the RF unit, and configured for receiving a handover request message from a relay node (RN), determining whether an X2 interface between the donor BS and a target BS is available or not.

The processor may be further configured for transmitting an X2 handover request message to the target BS if the X2 interface between the donor BS and the target BS is available.

The processor may be further configured for transmitting an S1 handover required message to a mobility management entity (MME) if the X2 interface between the donor BS and the target BS is not available.

The processor may be further configured for transmitting an X2 connection request message to the target BS if the X2 interface between the donor BS and the target BS is not available.

The processor may be further configured for receiving an X2 connection response message from the target BS if the X2 interface between the donor BS and the target BS is able to be setup.

Advantageous Effects of Invention

Unnecessary delay can be reduced when a handover error is occurred.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 6:
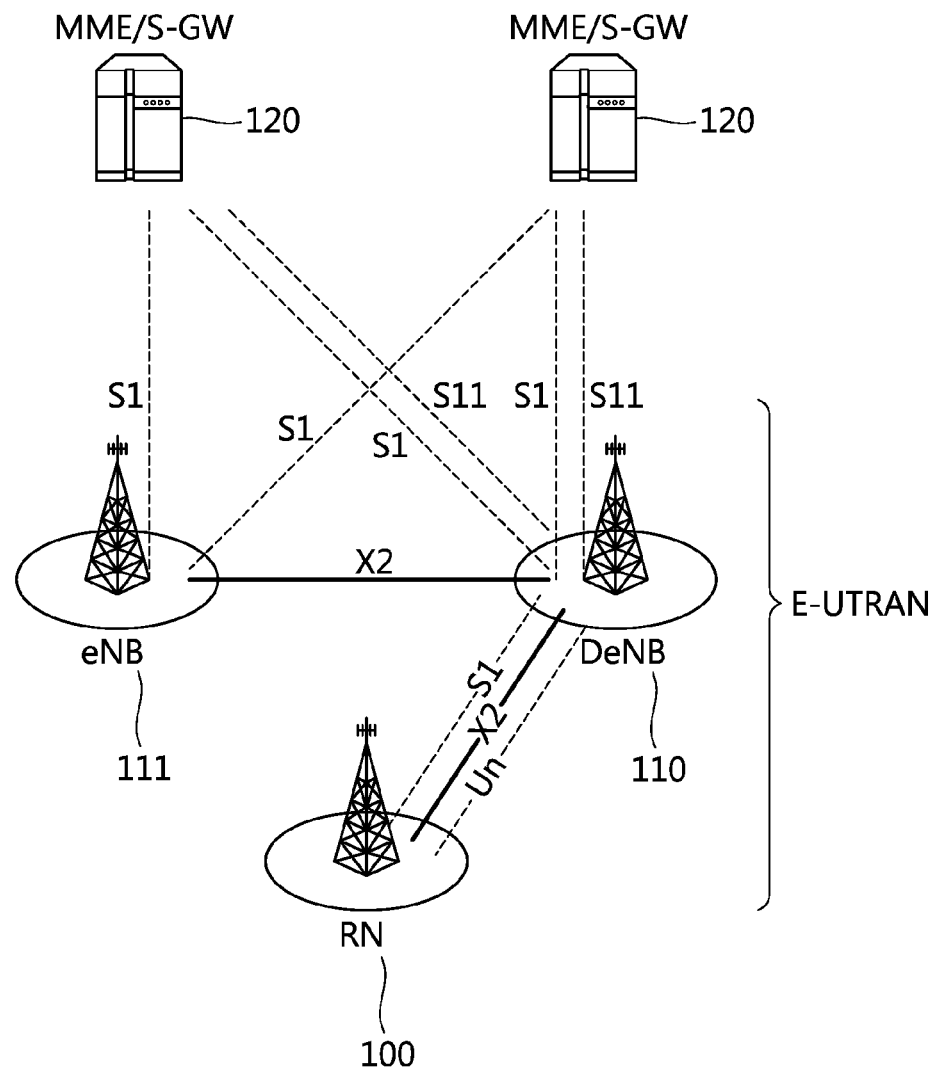
FIG. 6 is a block diagram illustrating network structure of an LTE-A system introducing a relay system.

FIG. 6 is a block diagram illustrating network structure of an LTE-A system introducing a relay system.

Referring to FIG. 6, the LTE-A network includes an evolved UMTS terrestrial radio access network (E-UTRAN), an Evolved Packet Core (EPC) and one or more user equipment (not described). The E-UTRAN may include one or more evolved NodeB (eNB) 111, one or more donor eNB (DeNB) 110, one or more relay node (RN) 100 and a plurality of user equipment (UE) 10 may be located in one cell. One or more E-UTRAN mobility management entity (MME)/system architecture evolution (SAE) gateways 120 may be positioned at the end of the network and connected to an external network.

As used herein, "downlink" refers to communication from the eNB 111 to the UE, from the DeNB 110 to the UE or from the RN 100 to the UE, "uplink" refers to communication from the UE to the eNB 111, from the UE to the DeNB 110 or from the UE to the RN 100. The UE refers to communication equipment carried by a user and may be also referred to as a mobile station (MS), a user terminal (UT), a subscriber station (SS) or a wireless device.

The eNB 111 and the DeNB 110 provide end points of a user plane and a control plane to the UE. MME/SAE gateway 120 provides an end point of a session and mobility management function for UE. The eNB 111 and MME/SAE gateway 120 may be connected via an S1 interface. The DeNB 110 and MME/SAE gateway 120 may be connected via an S1 interface. The eNBs 111 may be connected to each other via an X2 interface and neighboring eNBs may have a meshed network structure that has the X2 interface. The eNB 111 and the DeNB 110 may be connected to each other via an X2 interface The RN 100 is wirelessly connected to the DeNB 110 via a modified version of the E-UTRA radio interface being called the Un interface. That is, the RN 100 may be served by the DeNB 110. The RN 100 supports the eNB functionality which means that it terminates the S1 and X2 interfaces. Functionality defined for the eNB 111 or the DeNB 110, e.g. radio network layer (RNL) and transport network layer (TNL), also applies to RNs 100 unless explicitly specified. In addition to the eNB functionality, the RN 100 also supports a subset of the UE functionality, e.g. physical layer, layer-2, radio resource control (RRC), and non-access stratum (NAS) functionality, in order to wirelessly connect to the DeNB.

The RN 100 terminates the S1, X2 and Un interfaces. The DeNB 110 provides S1 and X2 proxy functionality between the RN 100 and other network nodes (other eNBs, MMEs and S GWs). The S1 and X2 proxy functionality includes passing UE-dedicated S1 and X2 signaling messages as well as GTP data packets between the S1 and X2 interfaces associated with the RN 100 and the S1 and X2 interfaces associated with other network nodes. Due to the proxy functionality, the DeNB 110 appears as an MME (for S1) and an eNB (for X2) to the RN. The DeNB 110 also embeds and provides the S-GW/P-GW-like functions needed for the RN operation. This includes creating a session for the RN 100 and managing EPS bearers for the RN 100, as well as terminating the S11 interface towards the MME serving the RN 100.

Among the hot issues of relay, handover is an important one due to the addition of Un interface.

Figure 1:
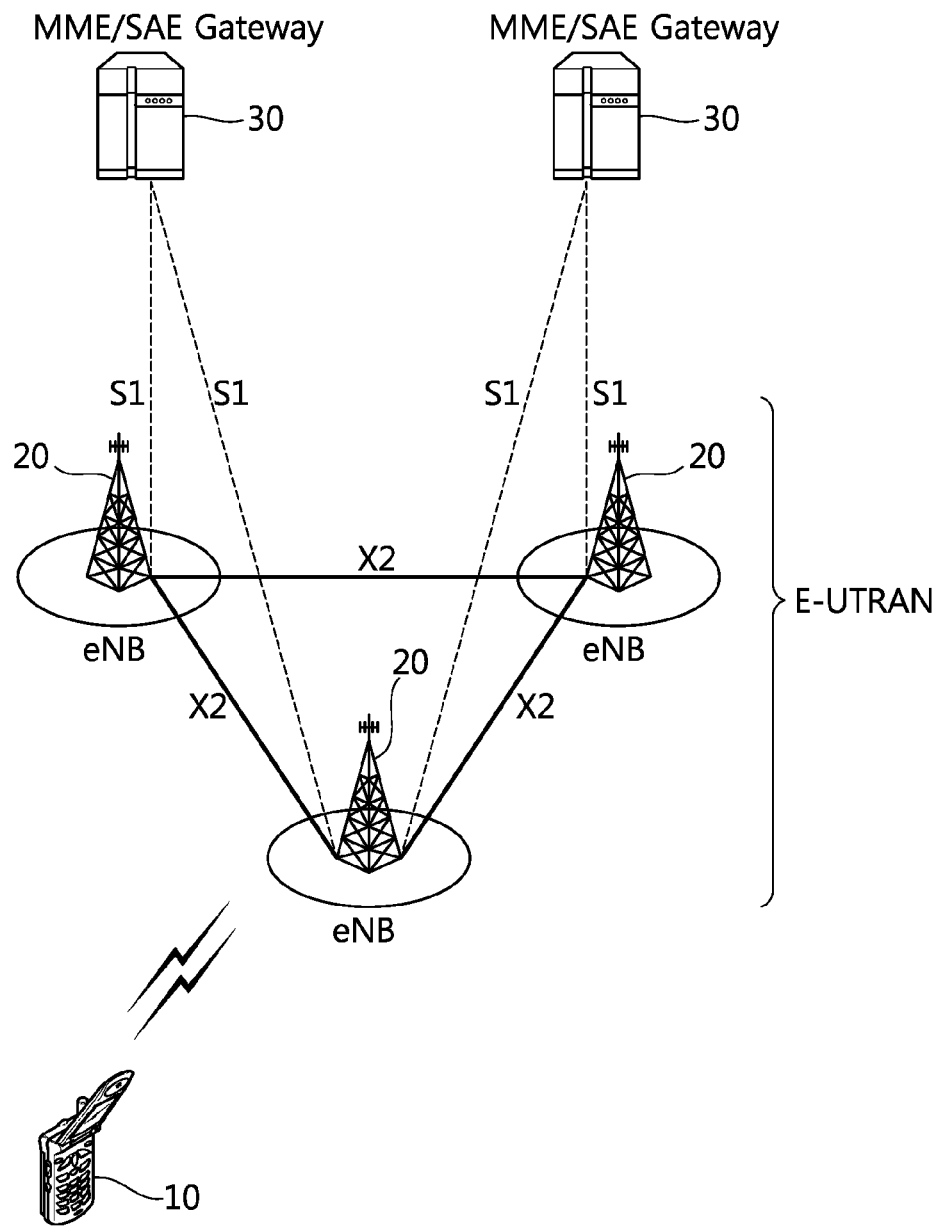
FIG. 1 is a block diagram illustrating network structure of an evolved universal mobile telecommunication system (E-UMTS).
Figure 2:
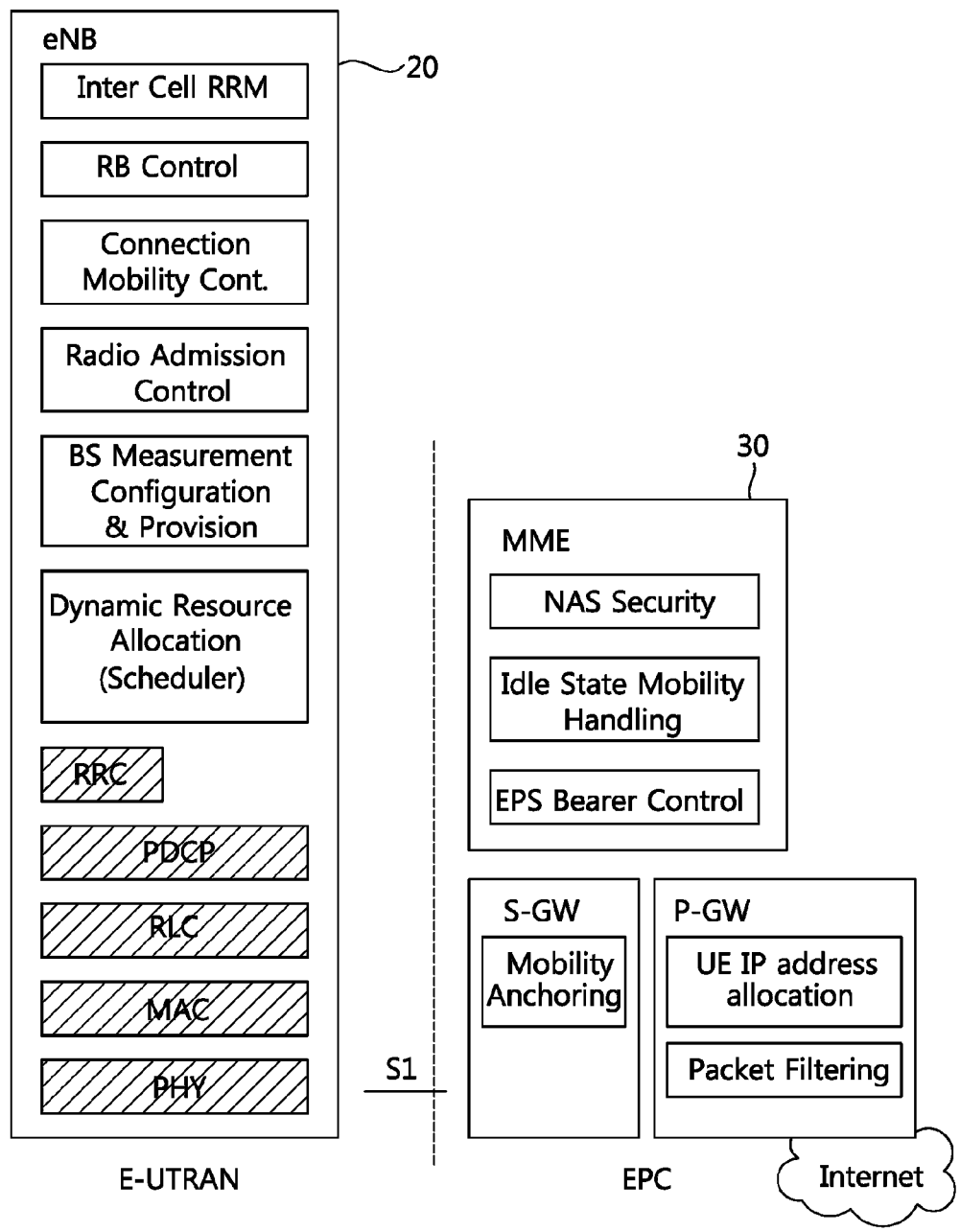
FIG. 2 is a block diagram depicting architecture of a typical E-UTRAN and a typical EPC.
Figure 3:
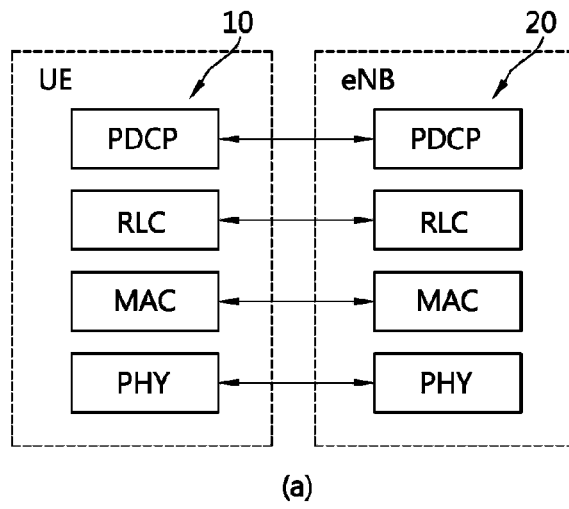
FIG. 3 is block diagram depicting the user-plane protocol and the control-plane protocol stack for the E-UMTS.
Figure 3:
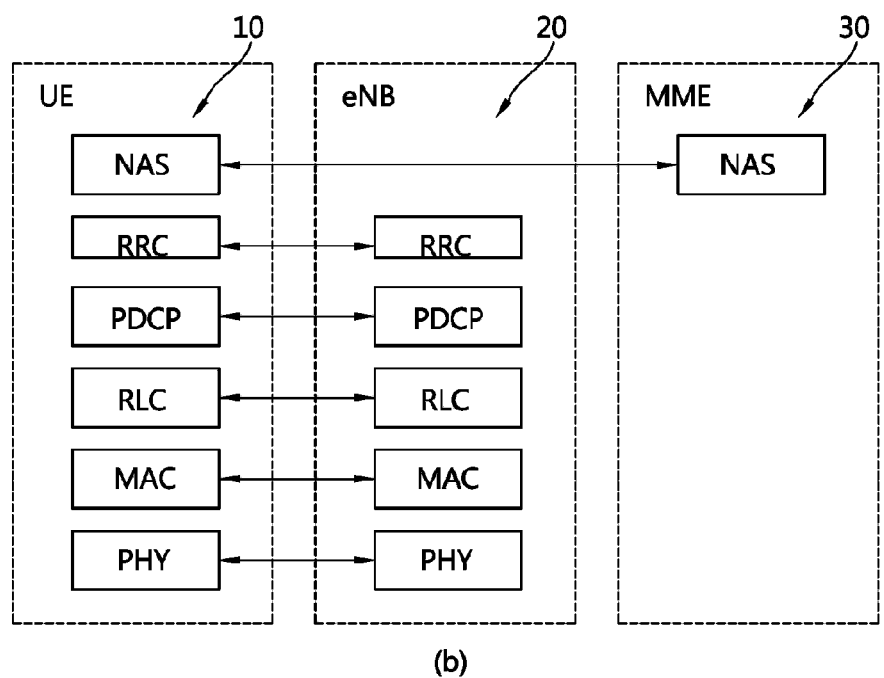
Figure 4:
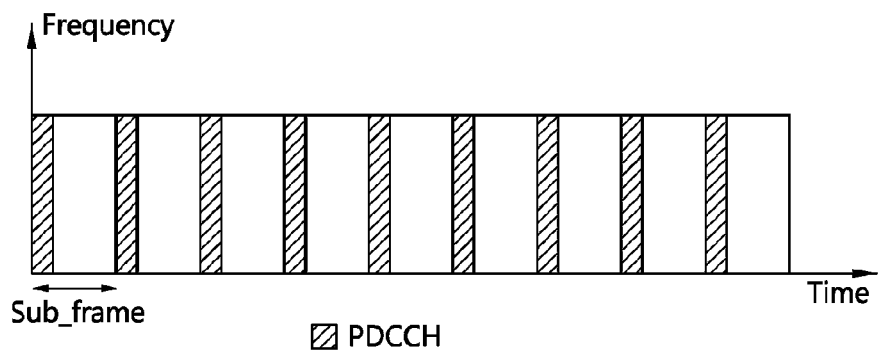
FIG. 4 is an example of structure of a physical channel. The physical channel transfers signaling and data between layer L1 of a UE and eNB.
Figure 5B:
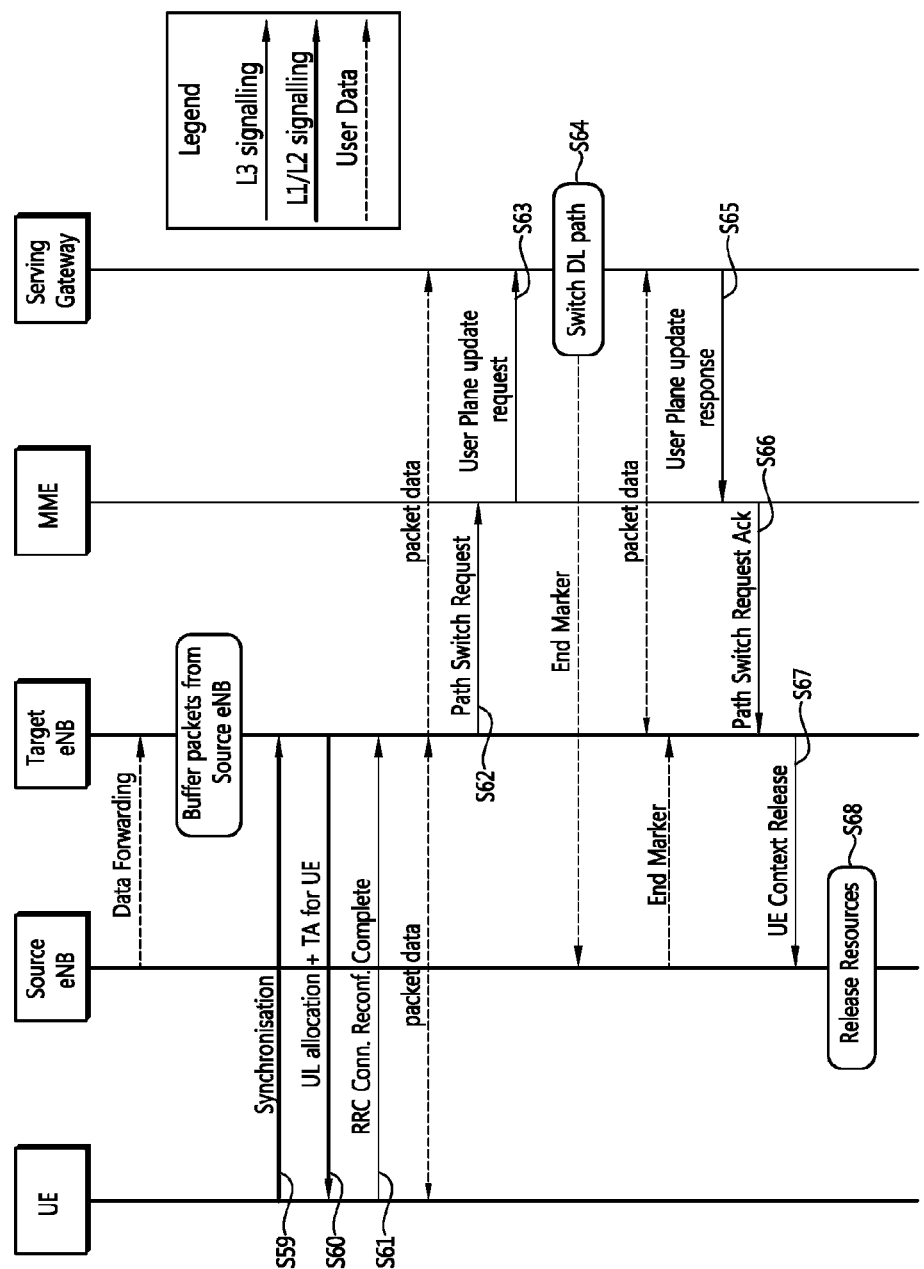
FIG. 5 is a basic intra-MME/serving gateway handover procedure.

FIG. 7 is an intra-MME/serving gateway handover procedure when a relay node is adopted. The handover procedure in FIG. 7 is similar to the handover procedure in FIG. 5. Unlike FIG. 5, a relay node (RN) and a donor eNB (DeNB) is included in FIG. 7. The DeNB in FIG. 7 performs the same function as the source eNB in FIG. 5. The RN is served by the DeNB.

First, the handover preparation procedure is described in FIG. 7(a).

In step S150, the RN configures the UE measurement procedures according to area restriction information, and transmits a measurement control message to the UE through L3 signaling. Measurements provided by the RN may assist the function controlling the UE's connection mobility. Meanwhile, the packet data is exchanged between the UE and the RN, between the RN and the DeNB, or between the DeNB and the serving gateway.

In step S151, the UE transmits measurement reports by the rules set by i.e. system information, specification etc to the RN through L3 signaling.

In step S152, the RN makes handover decision based on measurement reports and radio resource management (RRM) information.

In step S153, the RN transmits a handover request message through L3 signaling to the DeNB passing necessary information to prepare the HO at the target side. The DeNB delivers the handover request message through L3 signaling to the target eNB.

In step S154, the target eNB performs admission control. Admission control may be performed dependent on the received E-RAB QoS information to increase the likelihood of a successful HO, if the resources can be granted by the target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

In steps S155, the target eNB transmits a handover request acknowledge message to the deNB through L3 signaling, and prepares the handover. The DeNB delivers the handover request acknowledge message to the RN. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the RN receives the handover request acknowledge message, or as soon as the transmission of the handover command is initiated in the downlink, data forwarding may be initiated.

In step S156, the RN transmits a handover command message to the UE to perform the handover. The UE receives the handover command message with necessary parameters. The necessary parameters may include new C-RNTI, target eNB security algorithm identifiers, and optionally dedicated RACH preamble, target eNB SIBs, etc. The UE is commanded by the RN to perform the handover.

Hereafter, the handover execution procedure will be described.

When the handover execution procedure starts, the UE detaches from an old cell and synchronizes to a new cell. In addition, the RN delivers buffered and in-transit packets to the target eNB.

In step S157, the RN transmits an SN status transfer message to the DeNB to convey the uplink PDCP SN receiver status and the downlink PDCP SN transmitter status of E-RABs for which PDCP status preservation applies (i.e. for RLC AM). The DeNB delivers the SN status transfer message to the target eNB. The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The RN may omit sending this message if none of the E-RABs of the UE shall be treated with PDCP status preservation.

Figure 7B:
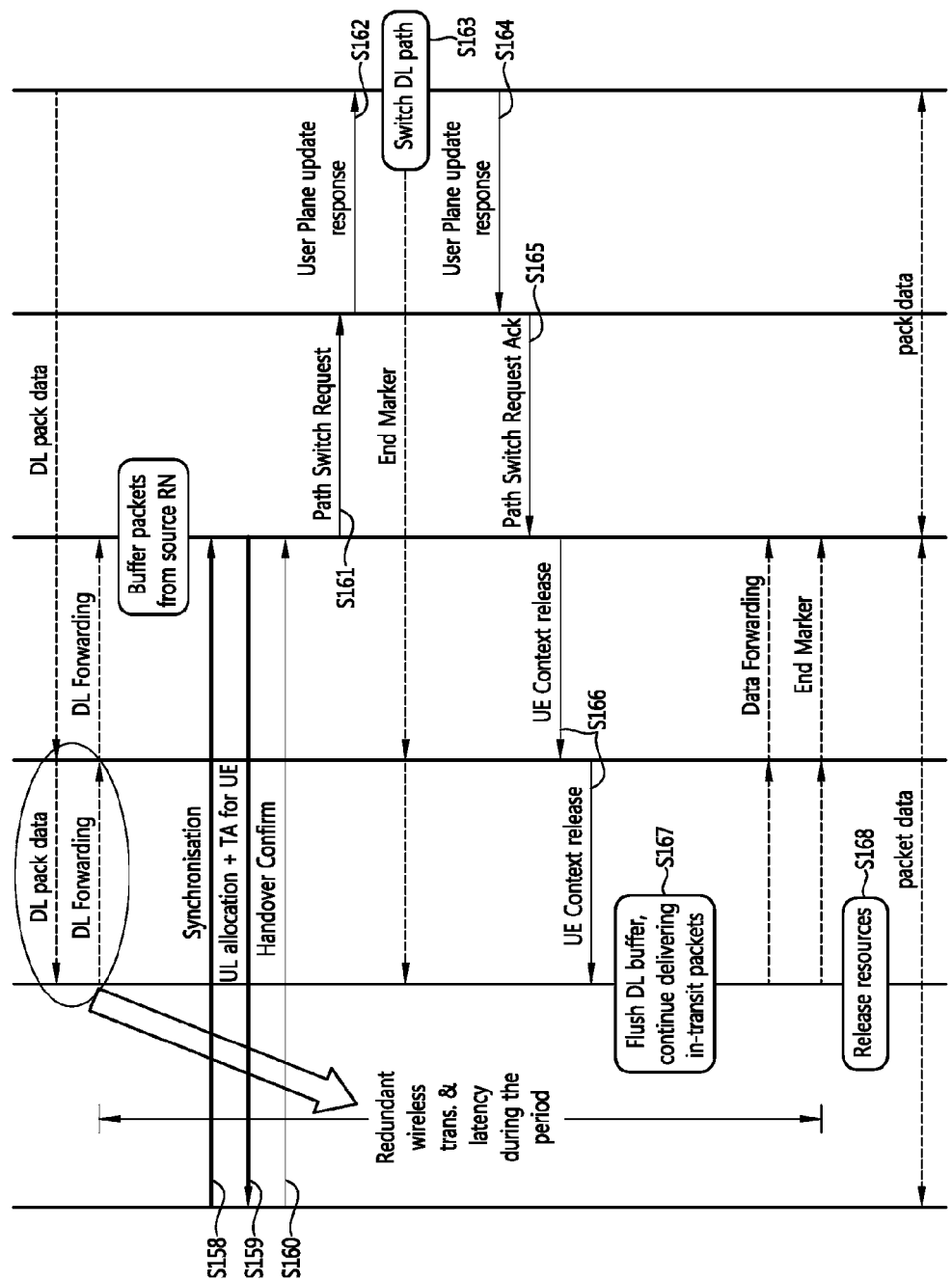
FIG. 7 is an intra-MME/serving gateway handover procedure when a relay node is adopted.

FIG. 7(b) is continued from FIG. 7(a).

In step S158, the UE performs synchronization to the target eNB and access the target cell via RACH. The access to the target cell via RACH may be a contention-free procedure if a dedicated RACH preamble was indicated in the mobilityControlInformation. Or, the access to the target cell via RACH may be a contention-based procedure if no dedicated preamble was indicated. The UE derives target eNB specific keys and configures the selected security algorithms to be used in the target cell.

In step S159, the target eNB responds to the synchronization of the UE with UL allocation and timing advance.

In step S160, when the UE has successfully accessed the target cell, the UE transmits an RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin transmitting data to the UE. The packet data is exchanged between the UE and the target eNB.

Hereafter, the handover completion procedure will be described.

In step S161, the target eNB transmits a path switch message to MME to inform that the UE has changed cell.

In step S162, the MME transmits an update user plane request message to the serving gateway.

In step S163, the serving gateway switches the downlink data path to the target side. The serving gateway transmits one or more end marker packets on the old path to the source eNB and then can release any U-plane/TNL resources towards the source eNB.

In step S164, serving gateway transmits an update user plane response message to MME.

In step S165 the MME transmits a path switch acknowledge message to the target eNB to confirm the path switch message.

In step S166, the target eNB transmits a UE context release message to the DeNB to inform success of the handover and trigger the release of resources. The DeNB delivers the UE context release message to the RN.

In step S167, the RN flushes DL buffer, and continues delivering in-transit packets.

In step S168, when the UE context release message is received, the RN can release radio and C-plane related resources associated to the UE context. Any ongoing data forwarding may continue.

There are two types of handover, i.e., X2-based handover and S1-based handover. Conventionally, the S1-based handover is supported regardless of the availability of X2 interface, and the X2-based handover is prioritized over the S1-based handover when X2 interface is available.

The S1-based handover is triggered by the following reasons.

1) No X2 connectivity to the target eNB
2) Error indication from the target eNB after an unsuccessful X2-based handover
3) Dynamic information learnt by the source eNB Even when the X2 interface is available between the DeNB and the target eNB, there would be the case (e.g., change of MME/PLMN) where the S1-based handover shall be performed.

Also, in case that the RN is deployed, the DeNB relays S1 messages between the RN and the MME (for S1-based handover) and X2 messages between the RN and the target eNB (for X2-based handover). Therefore, the RN should support both the S1-based handover and the X2-based handover and the conventional procedures of handover are reusable for relay deployment.

Figure 8:
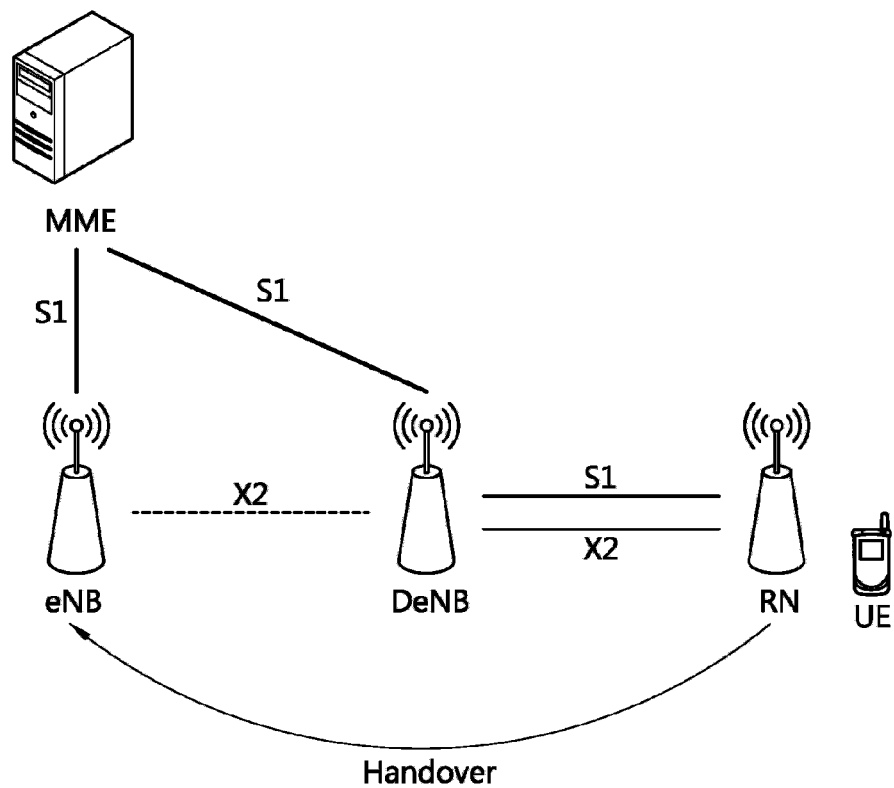
FIG. 8 is an example of the handover scenario of the LTE-A system when the relay node is deployed.

FIG. 8 is an example of the handover scenario of the LTE-A system when the relay node is deployed.

Referring to FIG. 8, there are one S1 interface and one X2 interface between the DeNB and the RN. In this scenario, the RN does not know the availability of X2 interface between DeNB and other eNBs. That is, when a UE is in progress for the handover from the RN to the target eNB, the RN cannot decide the handover type (X2/S1-based handover). FIG. 8 is an example of the handover scenario of the LTE-A system when the relay node is deployed.

Referring to FIG. 8, there are one S1 interface and one X2 interface between the DeNB and the RN. In this scenario, the RN does not know the availability of X2 interface between DeNB and other eNBs. That is, when a UE is in progress for the handover from the RN to the target eNB, the RN cannot decide the handover type (X2/S1-based handover).

Figure 9:
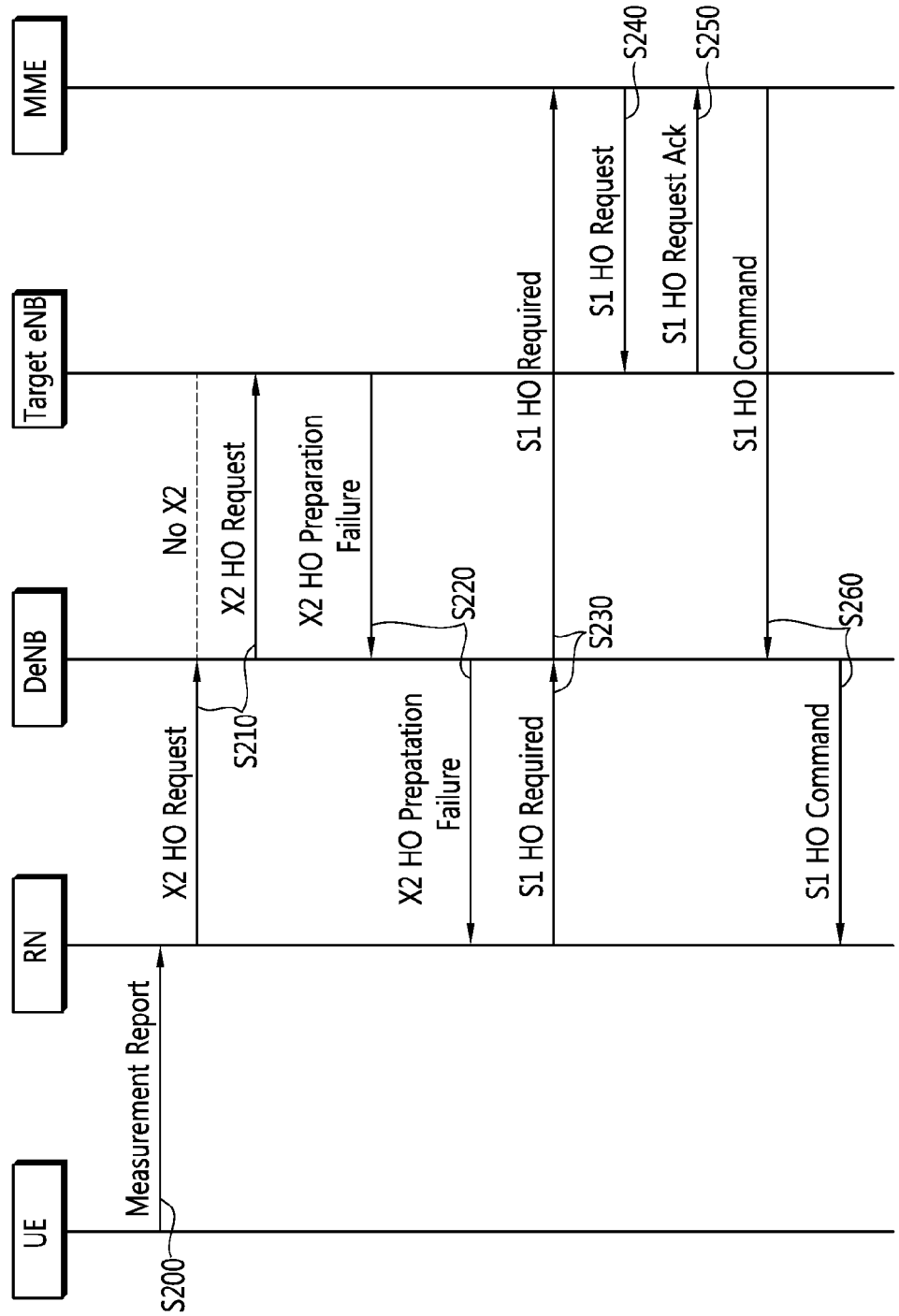
FIG. 9 is another example of the handover scenario of the LTE-A system when the relay node is deployed.

FIG. 9 is another example of the handover scenario of the LTE-A system when the relay node is deployed.

In step S200, the RN receives a measurement report message from the UE.

First, the RN attempts the X2-based handover. In step S210, the RN transmits an X2 handover request message to the DeNB.

However, the X2 interface is not available between the DeNB and the target eNB. The DeNB fails to forward the X2 handover request message to the target eNB. Accordingly, in step S220, the target eNB transmits an X2 handover preparation failure message to the DeNB. The DeNB forwards the X2 handover preparation failure message to the RN.

Because of the failure of the X2-based handover, the RN may attempt the S1-based handover. The DeNB may ask the RN to attempt the S1-based handover procedure by transmitting an error indication message to the RN. In step S230, the RN transmits an S1 handover required message to the DeNB. The DeNB forwards the S1 handover required message to the MME.

In step S240, the MME transmits an S1 handover request message to the target eNB.

In step S250, the target eNB transmits an S1 handover request acknowledgement message to the MME.

In step S260, the MME transmits an S1 handover command message to the DeNB. The DeNB forwards the S1 handover command message to the RN. Finally, the RN performs the S1-based handover procedure.

As shown in FIG. 9, because the RN does not know the availability of the X2 interface between the DeNB and the target eNB, unnecessary delay can be occurred in case that the X2 interface is not available between the DeNB and the target eNB. In addition, when the S1-based handover is completed successfully to the target eNB, the RN would attempt the S1-based handover procedure to other eNBs even if the X2 interface between the DeNB and other eNBs becomes available. That is, the RN cannot dynamically adapt to the DeNB's X2 interface variation.

According to the problem mentioned above, the conventional handover procedure of 3GPP LTE rel-8/9 system cannot be similarly applied to the handover procedure of 3GPP LTE-A system. Therefore, an efficient handover method which can solve the problem described above may be required.

The present invention provides that the DeNB decides and changes the type of handover. In other words, when the DeNB receives a handover request message from the RN served by the DeNB, the DeNB can decides and changes the type of handover according to the availability of the X2 interface between the DeNB and the target eNB.

Figure 10:
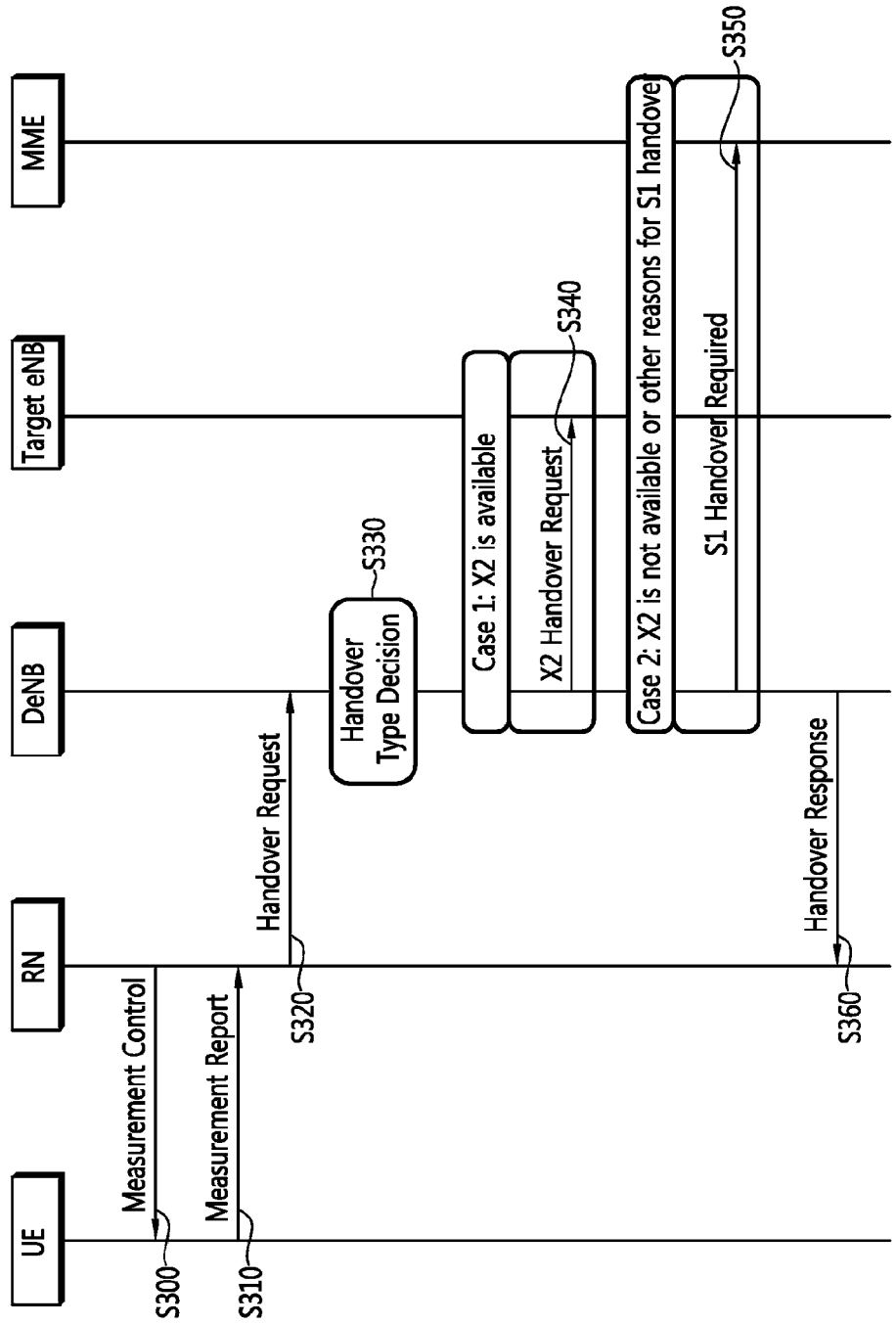
FIG. 10 is an example of handover procedure according to an embodiment of the present invention.

FIG. 10 is an example of handover procedure according to an embodiment of the present invention. From step S150 to step to S155 of the handover procedure in FIG. 7 can be replaced with the handover procedure described in FIG. 10.

In step S300, the RN transmits a measurement control message to the UE. It is assumed that the UE is served by the RN.

In step S310, the RN receives a measurement report message from the UE. The RN may find out the handover intention of the UE by the measurement report message. The measurement report message may include some information about the target eNB.

In step S320, the RN transmits a handover request message to the DeNB. The handover request message may include a handover indicator. The handover indicator just indicates the desire for handover, and does not indicate the type of handover. The handover indicator may include some information about the target eNB. The handover request message may be transmitted through the X2 interface between the RN and the DeNB.

In step S330, the DeNB decides the type of handover after receiving the handover request message received from the RN. That is, the handover decision is made at the RN, and the handover type decision is made at the DeNB. The DeNB may determine the availability of the X2 interface between the DeNB and the target eNB, and decides the type of handover according to the availability of the X2 interface.

In Step S340, in case that the X2 interface between the DeNB and the target eNB is available, the DeNB generates and transmits an X2 handover request message to the target eNB. The X2 handover request message may be transmitted through the X2 interface between the DeNB and the target eNB. The target eNB may receive the X2 handover request message, and may decide whether the handover to the target eNB is available or not. If the handover to the target eNB is available, the target eNB transmits a handover request admission message to the DeNB. If the handover to the target eNB is not available, the target eNB transmits a handover preparation failure message to the DeNB.

In Step S350, in case that the X2 interface between the DeNB and the target eNB is not available or that the S1-based handover procedure is triggered for other reasons, the DeNB generates and transmits an S1 handover required message to the MME. This is for changing the type of handover from the X2-based handover to the S1-based handover. The S1 handover required message is forwarded to the target eNB. The target eNB may decide whether the handover to the target eNB is available or not. If the handover to the target eNB is available, the target eNB transmits a handover request admission message to the MME. The MME transmits a handover command message to the DeNB. If the handover to the target eNB is not available, the target eNB transmits a handover failure message to the MME. The MME transmits a handover preparation failure message to the DeNB.

In step S360, the DeNB transmits a handover response message to the RN. The handover response message may be the handover request admission message or the handover preparation failure message mentioned above. After the X2 handover request message is transmitted to the target eNB or the S1 handover required message is transmitted to the MME, the conventional handover procedures may be performed.

Figure 11:
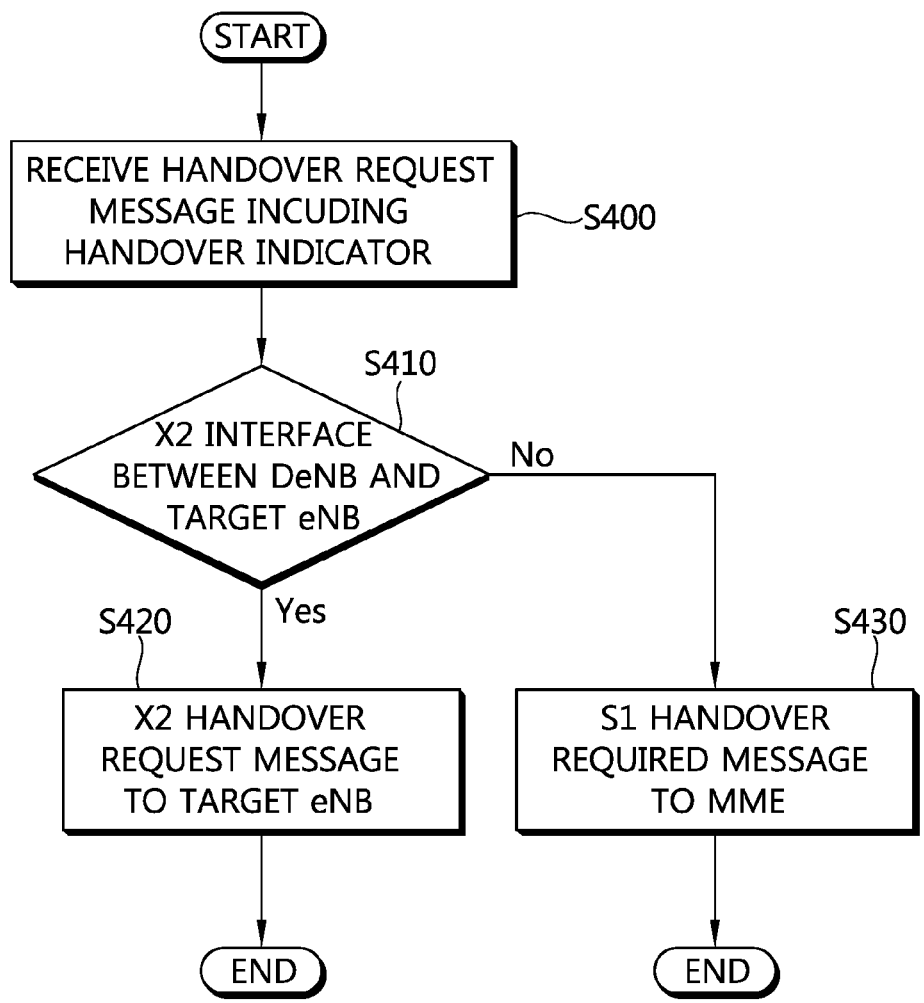
FIG. 11 is another example of handover procedure according to an embodiment of the present invention.

FIG. 11 is another example of handover procedure according to an embodiment of the present invention. FIG. 11 shows the handover procedure according to the present invention from the perspective of the DeNB.

In step S400, the DeNB receive a handover request message including a handover indicator from the RN. The handover indicator just indicates the desire for handover, and does not indicate the type of handover. The handover indicator may include some information about the target eNB. The handover request message may be transmitted through the X2 interface between the RN and the DeNB.

In step S410, the DeNB determine the availability of the X2 interface between the DeNB and the target eNB, and decides the type of handover according to the availability of the X2 interface.

In Step S420, in case that the X2 interface between the DeNB and the target eNB is available, the DeNB generates and transmits an X2 handover request message to the target eNB. The X2 handover request message may be transmitted through the X2 interface between the DeNB and the target eNB.

In Step S430, in case that the X2 interface between the DeNB and the target eNB is not available or that the S1-based handover procedure is triggered for other reasons, the DeNB generates and transmits an S1 handover required message to the MME. This is for changing the type of handover from the X2-based handover to the S1-based handover. The S1 handover required message is forwarded to the target eNB.

Meanwhile, when the S1-based handover procedure is performed due to that the X2 interface is not presence between the DeNB and the target eNB, the DeNB can attempt the connection of the X2 interface between the DeNB and the target eNB for UEs to handover later.

Figure 12:
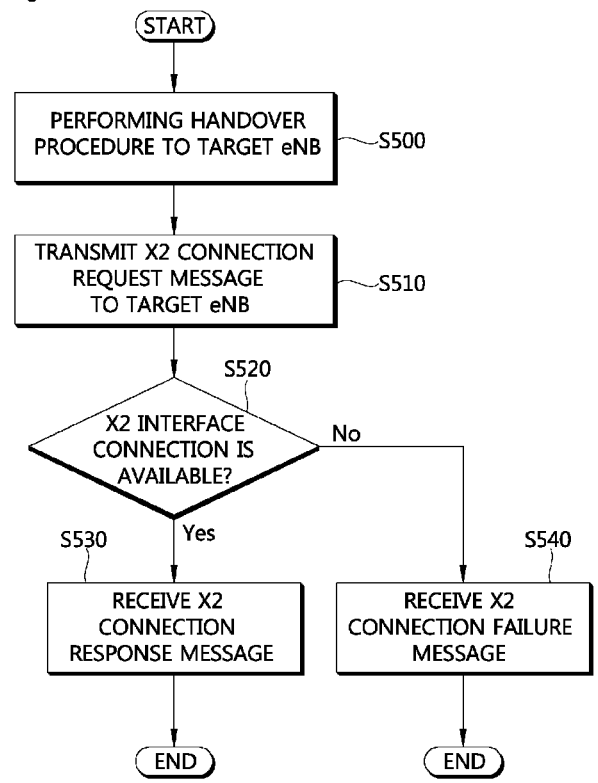
FIG. 12 is another example of handover procedure according to an embodiment of the present invention.

FIG. 12 is another example of handover procedure according to an embodiment of the present invention.

In step S500, the DeNB performs the S1-based handover procedure for the UE served by the RN to the target eNB. As the DeNB acknowledges the non-availability of the X2 interface between the DeNB and the target eNB, the DeNB can perform the S1-based handover procedure.

In step S510, the DeNB transmits an X2 connection request message to the target eNB. The DeNB may attempt the X2 interface connection between the DeNB and the target eNB based on the X2 connection request message.

In step S520, the target eNB determines whether it can setup the X2 interface connection with the DeNB.

In step S530, in case that the X2 interface connection can be setup between the DeNB and the target eNB, the DeNB receives an X2 connection response message from the target eNB. After that, the DeNB can perform the X2-based handover procedure to the target eNB for the handover request of a UE.

In step S540, in case that the X2 interface connection cannot be setup between the DeNB and the target eNB, the DeNB receives an X2 connection failure message from the target eNB. After that, the DeNB keeps performing S1-based handover procedure to the target eNB for the handover request of a UE.

According to the present invention, the DeNB can decide the type of handover according to the presence of the X2 interface between the DeNB and other neighbor eNBs when the DeNB receives a handover request message including a handover indicator from the RN. Therefore, unnecessary delay can be reduced and the problem of the conventional handover procedure can be overcome.

Figure 13:
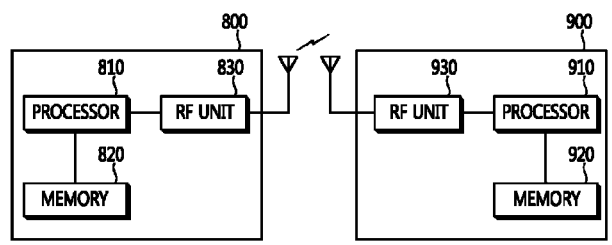
FIG. 13 is a block diagram showing wireless communication system to implement an embodiment of the present invention.

FIG. 13 is a block diagram showing wireless communication system to implement an embodiment of the present invention.

A BS 800 includes a processor 810, a memory 820, and an RF (Radio Frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An RN 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of performing a handover procedure by a donor base station (BS) in a wireless communication system, the method comprising:
   receiving a handover indicator, which indicates desire for a handover but does not indicate a type of the handover, from a relay node (RN) through a second X2 interface between the RN and the donor BS;
   determining the type of the handover according to whether a first X2 interface between the donor BS and a target BS is available or not;

if it is determined that the first X2 interface between the donor BS and the target BS is available, transmitting an X2 handover request message to the target BS via the first X2 interface;

if it is determined that the first X2 interface between the donor BS and the target BS is not available, transmitting an S1 handover required message to a mobility management entity (MME); and transmitting a handover response message to the RN, wherein the handover response message is a handover request admission message if the handover to the target BS is available, and wherein the handover response message is a handover preparation failure message if the handover to the target BS is not available.

2. The method of claim 1, wherein the RN receives a measurement report from a user equipment.

3. The method of claim 1, wherein:
the handover indicator is received via a handover request message, and
the handover request message includes information on the target BS.

4. The method of claim 1, further comprising transmitting an X2 connection request message to the target BS if the first X2 interface between the donor BS and the target BS is not available.

5. The method of claim 4, further comprising receiving an X2 connection response message from the target BS if the first X2 interface between the donor BS and the target BS is able to be setup.

6. The method of claim 4, further comprising receiving an X2 connection failure message from the target BS if the first X2 interface between the donor BS and the target BS is not able to be setup.

7. A donor base station (BS) in a wireless communication system, the donor BS comprising:
a processor configured for:
receiving a handover indicator, which indicates desire for a handover but does not indicate a type of the handover, from a relay node (RN) through a second X2 interface between the RN and the donor BS;
determining the type of the handover according to whether an X2 interface between the donor BS and a target BS is available or not;
if it is determined that the first X2 interface between the donor BS and the target BS is available, transmitting an X2 handover request message to the target BS via the first X2 interface;
if it is determined that the first X2 interface between the donor BS and the target BS is not available, transmitting an S1 handover required message to a mobility management entity (MME); and
transmitting a handover response message to the RN,
wherein the handover response message is a handover request admission message if the handover to the target BS is available, and
wherein the handover response message is a handover preparation failure message if the handover to the target BS is not available.

8. The donor BS of claim 7, wherein the processor is further configured for transmitting an X2 connection request message to the target BS if the X2 interface between the donor BS and the target BS is not available.

9. The donor BS of claim 8, wherein the processor is further configured for receiving an X2 connection response message from the target BS if the X2 interface between the donor BS and the target BS is able to be setup.

* * * * *